United States Patent [19]
Dean et al.

[11] Patent Number: 6,023,762
[45] Date of Patent: Feb. 8, 2000

[54] MULTI-VIEW PERSONALIZED COMMUNICATIONS AGENT

[75] Inventors: Robert John Dean; Brian Michael Unitt; Yashvant Kanabar, all of Bishops Stortford; Daniel Vincent McCaughan, County Down, all of United Kingdom

[73] Assignee: Northern Telecom Limited, Montreal, Canada

[21] Appl. No.: 08/890,054

[22] Filed: Jul. 9, 1997

[51] Int. Cl.[7] .................................................. H04L 9/00
[52] U.S. Cl. ........................ 713/193; 713/150; 713/168; 713/189; 713/200; 380/255
[58] Field of Search ............................. 380/4, 9, 23, 25, 380/49, 50, 59; 340/825.31, 825.34; 395/186, 187.01, 188.01; 342/255; 713/150, 168–181, 189, 200

[56] References Cited

U.S. PATENT DOCUMENTS

| | | | |
|---|---|---|---|
| 3,798,605 | 3/1974 | Feistel | 380/25 |
| 5,065,429 | 11/1991 | Lang | 380/25 |
| 5,191,611 | 3/1993 | Lang | 380/25 |
| 5,235,642 | 8/1993 | Wobber et al. | 380/25 |

FOREIGN PATENT DOCUMENTS

| | | | |
|---|---|---|---|
| 0442839A2 | 8/1991 | European Pat. Off. . | |
| 0447339A2 | 9/1991 | European Pat. Off. . | |
| 2238636A | 6/1991 | United Kingdom | G06F 1/00 |
| 2281645A | 3/1995 | United Kingdom . | |
| WO 96/05549 | 2/1996 | WIPO | G06F 1/00 |

OTHER PUBLICATIONS

Branstad, et al., "The Role of Trust in Protected Mail," 1990 IEEE Computer Society Symposium on Research in Security and Privacy, May 7–9, 1990 Oakland, California, pp. 209–215.

Ahad, et al., "HP OpensODB: An Object–Oriented Database Management System for Commercial Applications," Hewlett–Packard Journal, 44 (1992) Jun., No. 3, Palo Alto, CA, pp. 20–30.

Bhattacharyya, "Security of Network Element Databases Against Increasing Threats of Intrusion via Operations Interfaces," 1988 IEEE, pp. 51–64.

*Primary Examiner*—Bernarr E. Gregory
*Attorney, Agent, or Firm*—Lee, Mann, Smith, McWilliams, Sweeney & Ohlson

[57] ABSTRACT

A data access and retrieval system comprises a plurality of user data sources each storing electronic data signals describing data specific to a user, or enabling services selected by a user; an agent device which is configurable to select individual ones of the user data sources and present selections of user data and service data to a set of callers who may interrogate the agent device remotely over a communications network; a plurality of service terminals capable of communicating with the agent device over a communications network the service terminals operable by said callers; and a plurality of key devices, storing caller information and security code information for enabling remote access of selections of user data and/or services to be transmitted over a communications network to a caller located at a said service terminal.

9 Claims, 10 Drawing Sheets

Agent

| Category of Caller | Information that can be accessed by caller | Authentication Method Operated by Agent |
|---|---|---|
| Public | Who am I | None |
| Wife | Diary | Calling Line Identification (CLI) |
|  | Personal Information | Electronic Signature |
| Boss | Project Status | Password |
| Co Worker | Diary/Project info | Password |
| Self | Any | Electronic Signature |

Fig. 5

MULTI-VIEW PERSONALIZED COMMUNICATIONS AGENT

FIELD OF THE INVENTION

The present invention relates to a method and apparatus for accessing one or a plurality of data sources from a remote location across a communications network.

BACKGROUND TO THE INVENTION

It is known for individuals and organizations to maintain databases of personal information and other information which are accessible via communications systems such as the TCP/IP Internet, or various intranets. Such databases form a convenient means of providing information, or leaving messages, or voicemail, etc. However, security of information stored on databases remotely accessible over communications networks is becoming an increasingly important issue. Provision of access to information with limited security, such as password protection alone is unacceptable for commercially sensitive or personal information.

Where a database is distributed across a number of different server hosts, a usability problem can arise where multiple access addresses are required to be known to access data from a number of different databases. Where a person is issued with multiple access addresses, for addressing information at different database sites, then it is less likely that a database system will be utilized as effectively as it could be, if only a single address were issued.

SUMMARY OF THE INVENTION

Accordingly, it is an object of specific embodiments and methods of the present invention to provide for third party access to a database, having improved security over prior art systems.

It is further object of specific embodiments and methods of the present invention to provide improved ease of access to a database.

According to one aspect of the present invention there is provided an agent device for regulating access to user data in response to a request for user data generated at a remote location across a communications network, said apparatus comprising:

an authorization decoder capable of operating to receive and to recognize a plurality of authorization signals representing different levels of data access authorization to access said data;

a data storage means capable of storing a plurality of data records each relating to a set of user data types which are accessible in response to a corresponding said recognized authorization signal; and a data access signal generator for generating data access signals for accessing authorized data types.

The agent is addressable by a caller from a remote location across a communication network such as a telecommunications network, intranet, cable network or the internet.

Said user data types may include user-definable data available from a user data source. Said user data types may include service data available from a service provider device.

Preferable said data storage means is capable of being partitioned into a plurality of different data views, each comprising a set of said user data types which are authorized for access in response to receipt of a said recognized authorization signal.

By partitioning the data storage means into a plurality of data views, control over different types of user data having different levels of confidentiality can be implemented in a distributed data storage environment where data sources are physically located at disparate locations, and where data may be located on data storage devices operating in different protocol domains.

Preferably said data storage means comprises a look-up table configured to store; data describing a plurality of types of said authorization signals; and data describing a plurality of said user data types accessible in response to receipt of each said recognized authorization signal type.

Preferably said authorization decoder comprises a decryption means operating to recognize a received encrypted authorization signal. The authorization decoder may comprise a means for encryption of said accessible data, such that said accessible data is encrypted prior to release of said data by said agent device.

According to a second aspect of the present invention there is provided a method of accessing a plurality of user data sources from a location remote from said user data sources over a communications network, said method comprising the steps of:

receiving a request signal requesting access to user data available from at least one said user data source;

receiving an authorization signal representing an authorization to access user data available from said at least one user data source; and recognizing said authorization signal;

reading look-up table data describing types of user data which are authorized for access in response to a said received authorization signal; and generating access signals containing access data enabling access of authorized data types from at least one said user data source.

Said step of recognizing an authorization signal may comprise decoding an encrypted data signal.

The invention includes the method as described in the second aspect, operating in an electronic agent device comprising: a data storage means having a look-up table capable of storing a plurality of data records; and a data access signal generator capable of generating data access signals for accessing authorized user data types.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 5 illustrates an example of a configuration of data in a look-up table of an agent device;

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

Figure 1:
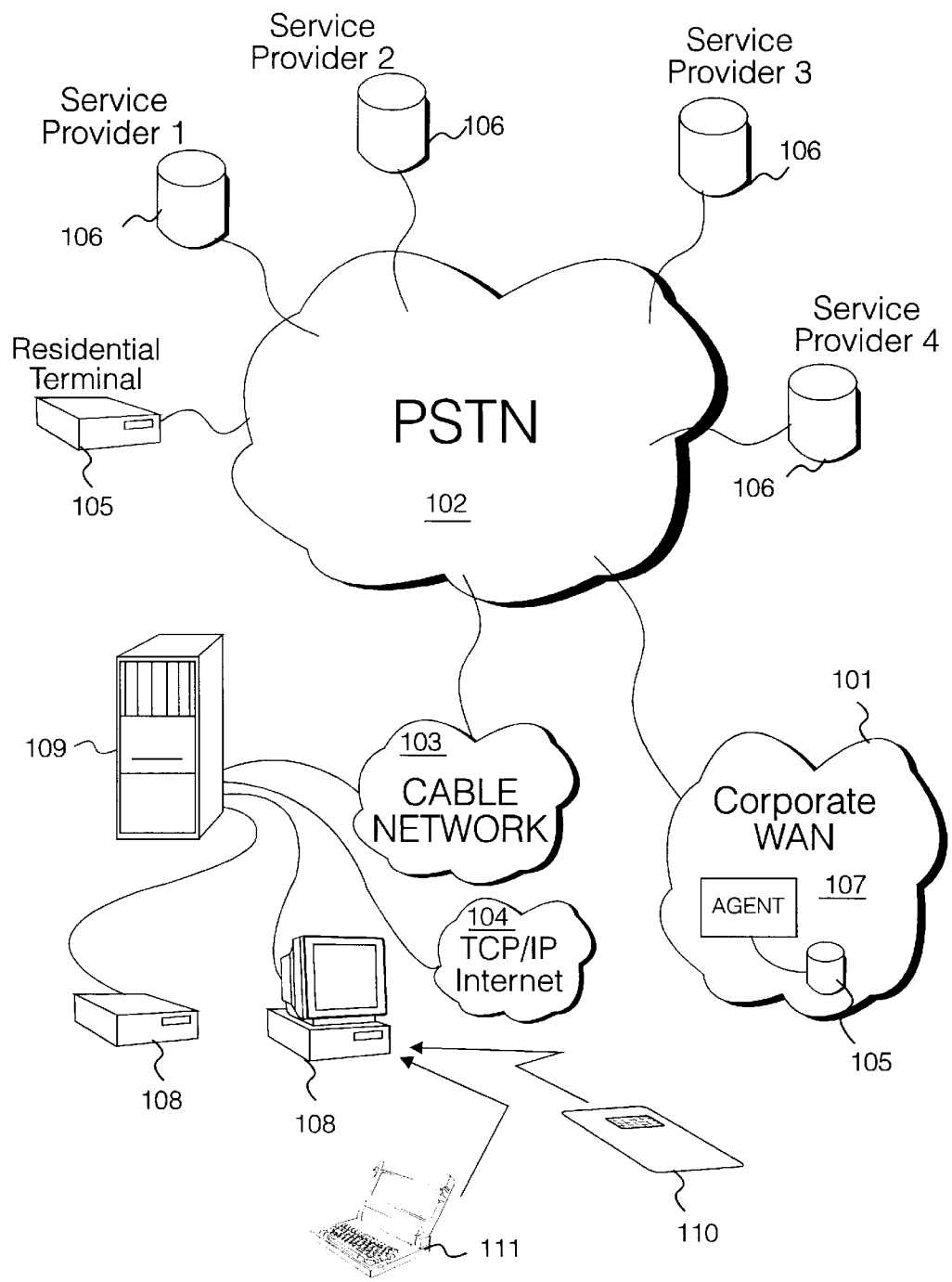
FIG. 1 illustrates a data access and retrieval system for remotely accessing and retrieving user data and/or services by a plurality of callers, each caller being presented with a predetermined selection of user data available to that particular caller.

Referring to FIG. 1 herein, there is illustrated a system for remote access and retrieval of data over one or more communications networks. The system comprises one or a plurality of user data sources at locations accessible by a communications network, for example being resident within a corporate wide area network 101, or accessible via a telecommunications network 102 such as for example a public switched telephone network, a cable network 103, and/or the transmission control protocol/Internet protocol network (Internet) 104; a said user data source comprising a database 105, such as a data storage medium storing user specific data, eg a hard disc drive, a read-only memory, a tape drive, or a compact disc read-only memory or a service provider source 106, for example an electronic data service systems such as libraries, stock market price services or the like, also accessible over a communications network; an electronic agent device 107 operating to control access and retrieval of data from the user data sources; a plurality of service terminals 108 through which a user may remotely access and retrieve data and/or services from said user data sources; a private branch exchange (PBX) 109 or similar access point to the telecommunications network 102; and one or a plurality of key devices, a said key device comprising any device capable of entering a request for data and/or services, of authenticating that request, and resulting in the obtaining of such data and/or services. Examples of key devices include a smart card 110 or a laptop computer 111. In some circumstances, a graphical user interface or keyboard and video device comprising the service terminal may perform as a key device. A said service terminal may communicate with the agent 107 via an access network telephone equipment item, for example a said private branch exchange (PBX) 109 and through a telecommunications network, via a direct link to a cable network 103, or via the Internet 104. In the best mode herein, where the key device is a stand alone entity physically separate from the service terminal, remote access and retrieval of data from the user databases 105 and service provider sources 106 is restricted by use of the key device which must be physically presented to a key device port of a service terminal in order to gain access to and retrieve data from a user data sources via the agent 107. The key device provides differing levels of security, for accessing data or services of different types from the user data sources. However, it will be appreciated that a stand alone key device is not an essential feature for operation of other specific embodiments of the present invention, and access to data from remote databases may be available in response to an authorization signal entered at a service terminal.

Figure 2:
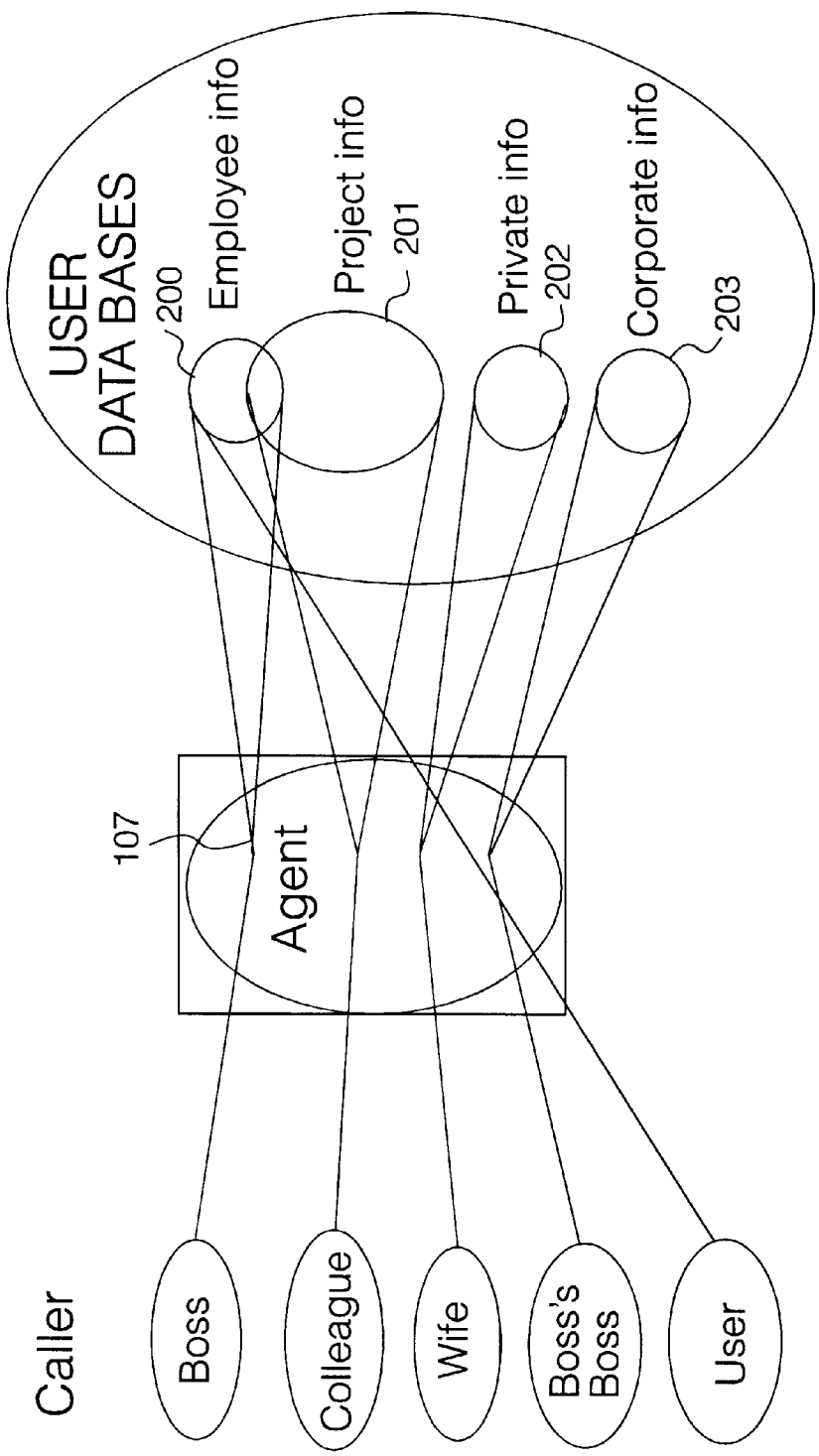
FIG. 2 illustrates a general principle of operation of the data access and retrieval system of FIG. 1.

Referring to FIG. 2 herein a basic principle of operation of the system will now be described in general terms. A user maintains one or more user databases 200–203 containing data describing personal and/or corporate information. Such information is stored in the form of electronic data signals in one or more data storage means, for example a hard disc drive, computer memory, tape streamer, CD ROM or the like. Examples of types of user information which may be stored include:

Personal preferences, eg indicating dietary requirements;

Private personal information such as lists of friends and relatives;

Bank or credit card details

Personal medical details;

Corporate information such as customer lists, technical information, or contractual information;

Employee information, including salary or employment record.

In general any type of information which can be stored electronically as electronic data may be stored in the user databases. Additionally, the user may define a plurality of data source providers which are accessible to callers by referring to the agent 107.

Such user information may have various levels of security, and a user may wish to restrict access to such information depending upon who is requesting that information. A plurality of callers operating key devices access the user data sources by addressing the agent 107. Access to user data describing the user information is controlled by the electronic agent device 107 which allows or denies access to portions of data stored in the user data sources depending upon who is requesting the information and the type of data requested to be accessed. The user configures the electronic agent to store data records describing types of user data and to specify areas of data in the user data sources which are accessible by various callers or types of caller. The user-definable stored data records allow one or more "data views", for each caller or category of caller. By configuring the agent with a set of data views, the user "personalizes" the types of data and services which can be accessed by each caller or category of caller through the agent. For example a user may configure the agent device to allow work colleagues to have access to project information, or to allow their spouse to have access to personal information eg medical or private bank details, whilst allowing their work boss to have access to employee information and their boss's boss to have access to higher level corporate information. The user would typically configure the agent device to allow the user themself to have access to all categories of user data stored in the user data sources. The user may define specific "data views" for his or her own use. For example the user may define a "hotel view" comprising data to be accessed by the user from a remote location such as a hotel, conference center or the like. This may enable a user to prepare for a business trip by collating data into a "data view" which can be accessed remotely.

The user databases 105 store a plurality of data files in the form of digital signals, which are segregated within the data storage means by file names, path names or other unique identifiers. Access to the user databases is available over the communications network only through the agent, which as well as collating and presenting the user data, also restricts access to the user data.

Figure 3:
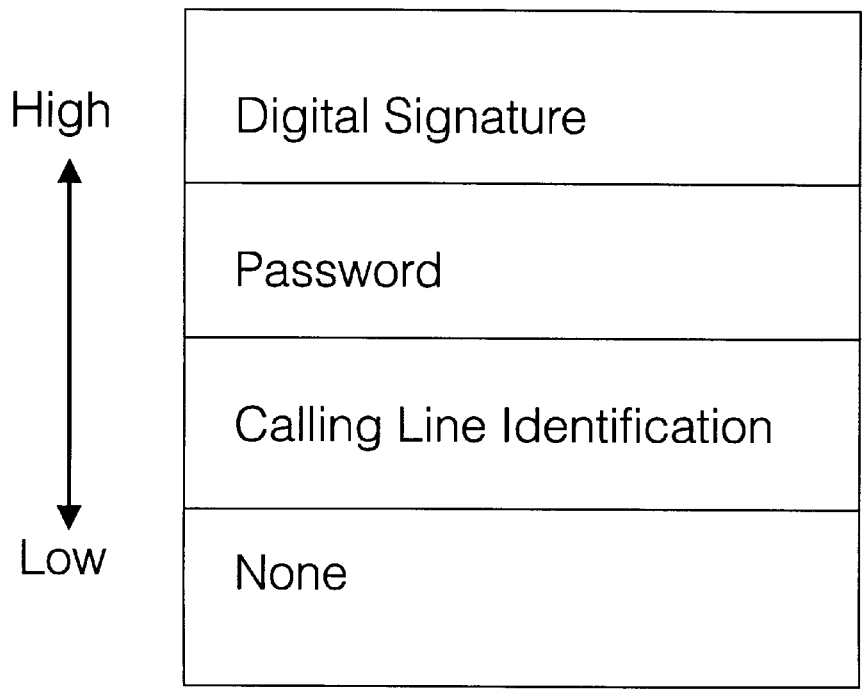
FIG. 3 illustrates schematically different levels of authentication enabling access to user data sources.

Since the user data sources are accessed remotely over a communications network, security of information is of paramount interest. Security of access to data in the databases 105 is controlled by the electronic agent which is configured by the user. As illustrated in FIG. 3 herein, levels of authentication may be graded from having no security authentication at all through to identification of a calling line on which a request for information is received, to higher levels of authentication including passwords or encrypted digital signature signals. The encrypted digital signature may be provided through a known public key encryption system, several of which are available commercially, for example as used in products available by inspecting Netscape®, or for example the Entrust® system of Northern Telecom Limited, or a known private key encryption system. The digital signature provides a confirmation of the identity of the caller and/or user.

Figure 4:
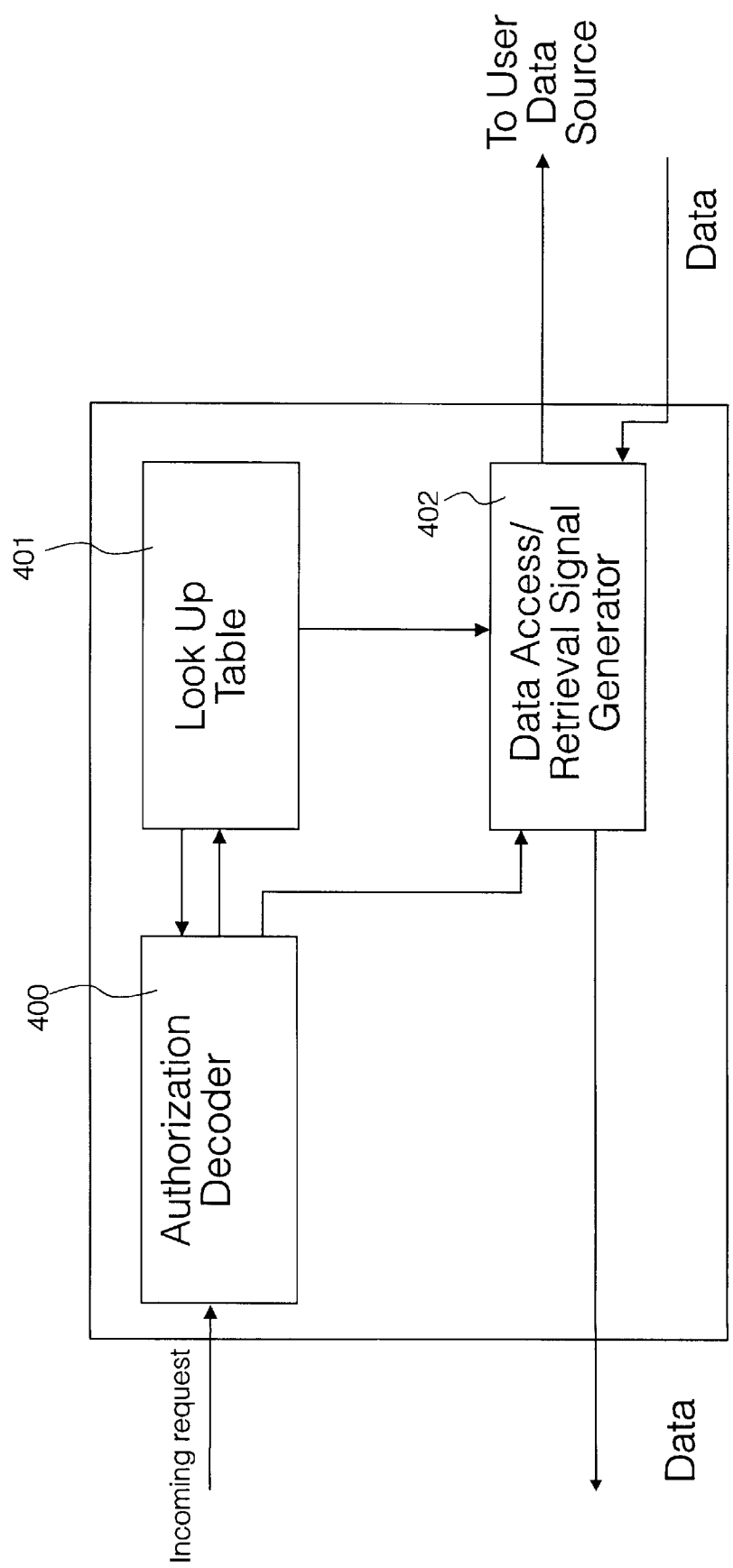
FIG. 4 illustrates an internal architecture of an agent device configured for providing customized user data source information to the plurality of callers.

Referring to FIG. 4 herein, the agent comprises: an authentication decoder 400 for authorizing access to information in the data sources; a look-up table 401 addressed by the authentication decoder in order to determine whether access can be made available to a caller or denied; a data retrieval signal generator 402 which enables retrieval of data from the user data sources; and an access record memory 403 which keeps a log of details of requests for access to user data, and user data retrieved and sent over the communications network, identifying a source and an end destination of the retrieved user data. The authentication decoder may comprise a processor and data storage means operating in accordance with a decode algorithm stored as electronic control signals and data signals in the data storage means. The decode algorithm may include an algorithm of the known public key system or private data encryption system as described herein above.

Referring to FIG. 5 herein, there is illustrated an internal data structure of look-up table 401. The look-up table comprises data lists of types of caller who may request information from the user database, and for each caller type, sets of data files or types of data files in the user data sources which can be accessed by that category of caller, together with a corresponding authentication method, corresponding to a respective level of authentication. For example, the look-up table 401 stores under a record for category caller type "general public" data representing information such as personal identification details of the user, ie name. In order to access this type of information from the user database, no authentication is required. On the other hand, the look-up table stores data that a request from the user themselves can enable access to any data file in the user databases, but access and retrieval of that data needs to be authenticated by use of an electronic digital signature signal, this being the highest level of authentication. Each caller interrogating the agent is provided with a "personalized view" of the user data sources by virtue of the information stored in the look-up table of the agent device. By "personalized view" it is meant a data view being a pre-configurable set of user data files and/or data file types and/or services or service types which can be accessed from the user date sources by a caller or category of caller on presentation of a corresponding authorization signal. The user data may be collected from a distributed number of individual data sources. For example a user may store his personal medical information and personal financial details as electronic data on a database at a residential user data source in the user's house. This residential data source will have a specific Internet address, or could be part of a corporate wide area network. On the other hand, data relating to sales information, technical projects, or other information concerning the users employment may be stored at another user data source on a corporate wide area network, having a second Internet address. When the user requests access to his or her data from a remote location the agent receives a data request signal from the user, and may collate the information from the different data sources prior to forwarding this to the user at the remote location.

The authentication decoder recognizes the caller's electronic signature signal and addresses look-up table 401 to locate stored data, which is restricted to the predetermined data views with which the user has configured the agent corresponding to the electronic signature. Authentication decoder 400 also authorizes the data retrieval signal generator 402 to issue appropriate access and retrieval signals to one or more user data sources containing data specified in the data view. The data retrieval signal generator receives the locations of the authorized data from the look-up table 401. The user data sources forward the required data to the data retrieval signal generator 402, which then transmits the data to the callers' service terminal at the remote location.

At a highest level of security, using a digital electronic signature confirmation of an identity of a caller may be verified using the private or public encryption system as hereinbefore described. Typically, a private encryption system comprises an encryption algorithm and a decryption algorithm, each of which are stored on the key device and at the agent device. The encryption algorithm operates to encrypt data using a keyword signal, for example a personal identification number or sequence of digits or mnemonics which is unique to the user and which is known by the caller. The user, who owns the data specifies the keyword, and must inform the caller of the keyword, to allow them to access data. Both the caller and the user must use the same keyword to enable encryption and decryption of data. The decryption algorithm decodes the encrypted data using the keyword. On successfully decrypting a signal from the caller, the agent device allows access to an appropriate data view depending on the category of caller. The agent may send the requested data to the service terminal in encrypted form and the decryption algorithm stored on the key device is used to decrypt the data sent by the agent. The decryption algorithm stored in the key device requires knowledge of the keyword in order to decrypt the received encoded data.

In the known public key system, there is provided an encryption algorithm and a decryption algorithm stored both on the key device and at the agent. The public key system uses a public keyword and a private keyword both of which are specific to the caller. For use in electronically signing, the caller communicates to the agent via the service terminal using signals which are encrypted using the private keyword, and the agent device decrypts the received signals using the public keyword, and recovers the original encrypted signals, which represents the callers "electronic signature" and identifies with the caller. In the public key system all parties must register with a central administration body who controls access to the algorithms and keywords. Electronic signatures are registered to subscribers of the system by the administrating body, who is trusted to ensure that the callers are identifiable by reference to their keywords.

There will now be described an example of a sequence of operation of the data access and retrieval system with reference to FIGS. 1 to 9 herein.

Figure 6:
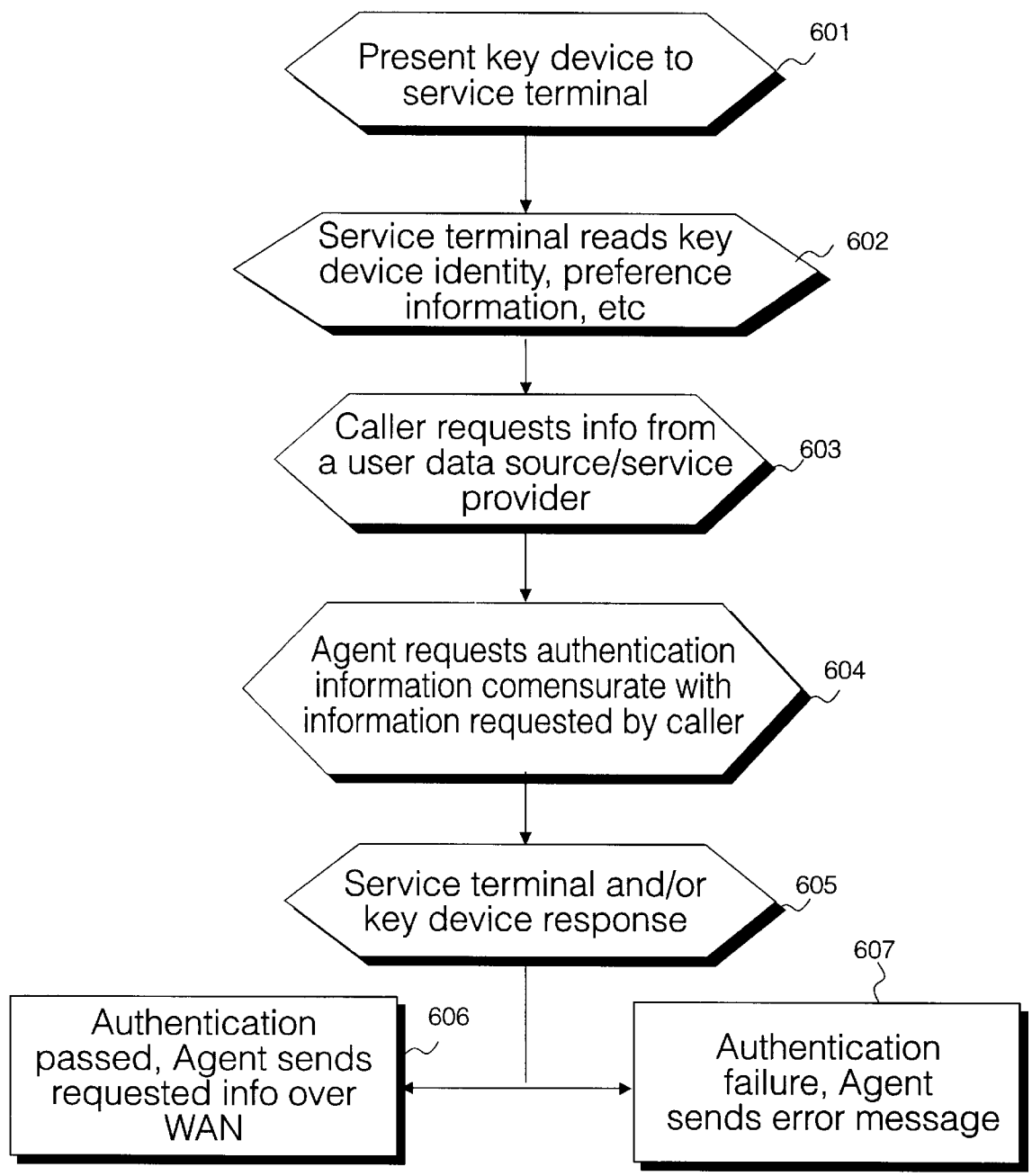
FIG. 6 illustrates an example of a general method of operation of the data access and retrieval system of FIG. 1.

Referring to FIG. 6 herein, a general overview of operation is shown. In step 601, a caller wishing to access the user databases and/or service providers providing data or services specified by the user physically presents a key device at a service terminal. In step 602, the key device communicates with the service terminal, and logs in data describing details of the key device, such as an electronic code identifying the key device, or an Internet address of the device. The service terminal optionally transmits log-in data to the key device and an address or addresses of one or more agents which are to be interrogated. Such service terminal log-in data may comprise data describing the location and address of the service terminal, together with the time and date of log-in. In step 603, the caller requests information from a user data source or service provider. Such request may be made through the key device itself, where the key device comprises a laptop computer, or alternatively where the key device comprises a smart card, the caller may request such information by operating a keyboard device or pointing device such as a mouse or trackball comprising the service terminal. The service terminal transmits the request for data to the user's agent device, the address of which has been downloaded from the key device in step 602. In step 604, the agent, having received the request from the service terminal requests authentication of the request from the service terminal. The service terminal responds by transmitting information describing the location of the service terminal, and the identity of the caller, as read from the key device, to the agent. The authentication decoder 400 of the agent then determines whether access to user data can be permitted, by comparing the caller identification data received from the service terminal with data stored in the look-up table 401. If the pre-configured look-up table is configured that the caller must provide additional security identification such as a password, or electronic signature, the agent requests the password or electronic signal from the service terminal. In the case of a password, the caller may type in the password at a keyboard of the service terminal, or at a keyboard of the key device, or the service terminal may obtain the password from a pre-stored location in the key device. In the case of a higher level of identification such as a digital electronic signature, the service terminal must obtain this signature from the key device. The key device may contain an algorithm, stored either as an application where the key device comprises a laptop computer, or stored in an application in a memory device on a smart card. In step 605, the algorithm produces the electronic signature which is read by the service terminal and transmitted to the agent device over the communications network. Since the digital electronic signature is algorithm generated, a corresponding said decode algorithm comprising the authorization decoder may operate to decode the received electronic digital signature to determine whether the digital electronic signature is genuine. If the signature is authentic, in step 606, the authentication decoder authorizes the data retrieval signal generator to access the information from the user data sources to be sent to the service terminal.

Figure 7:
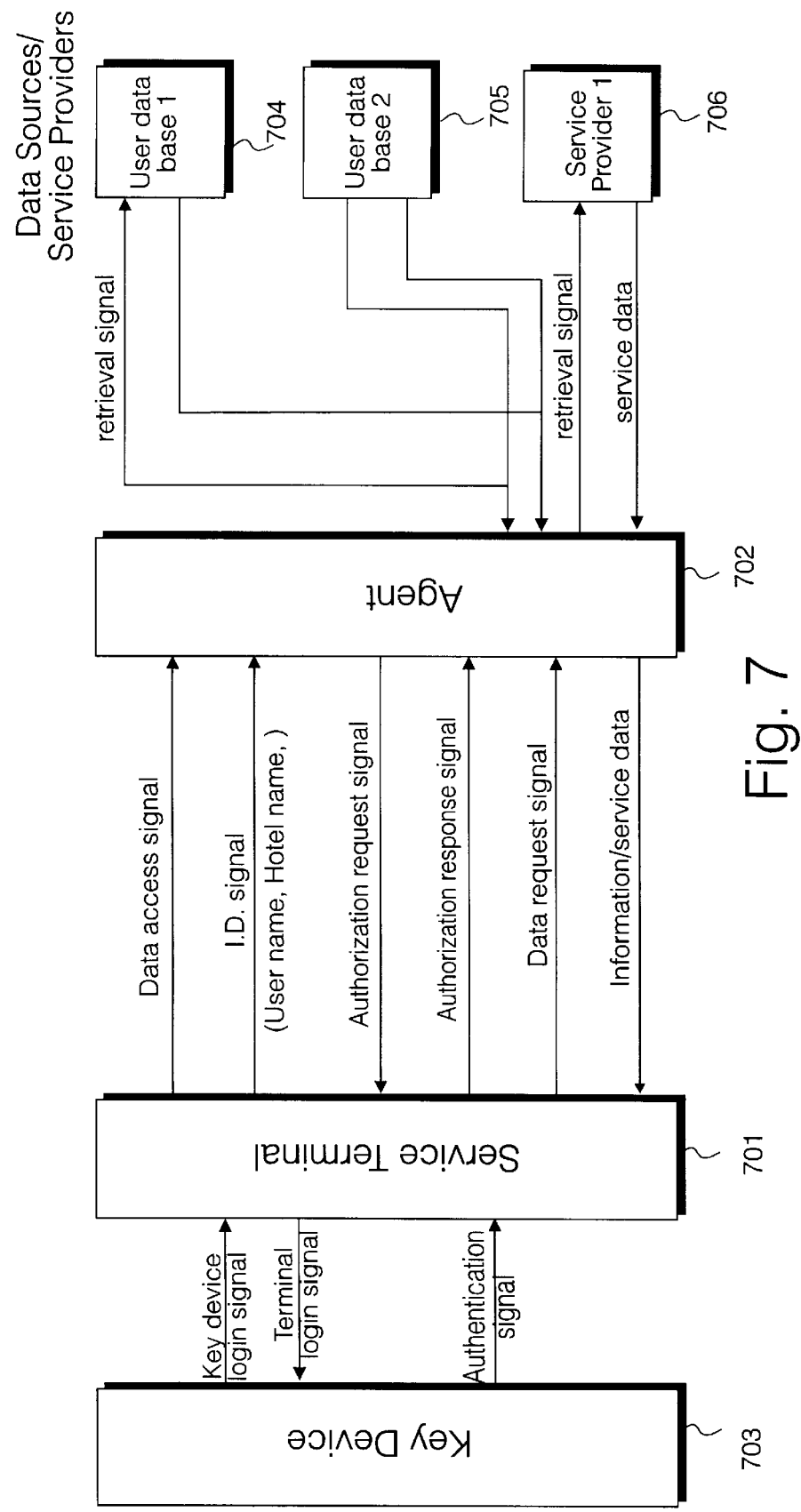
FIG. 7 illustrates a general example of transmission of signals between individual components of the data access and retrieval system of FIG. 1.
Figure 8:
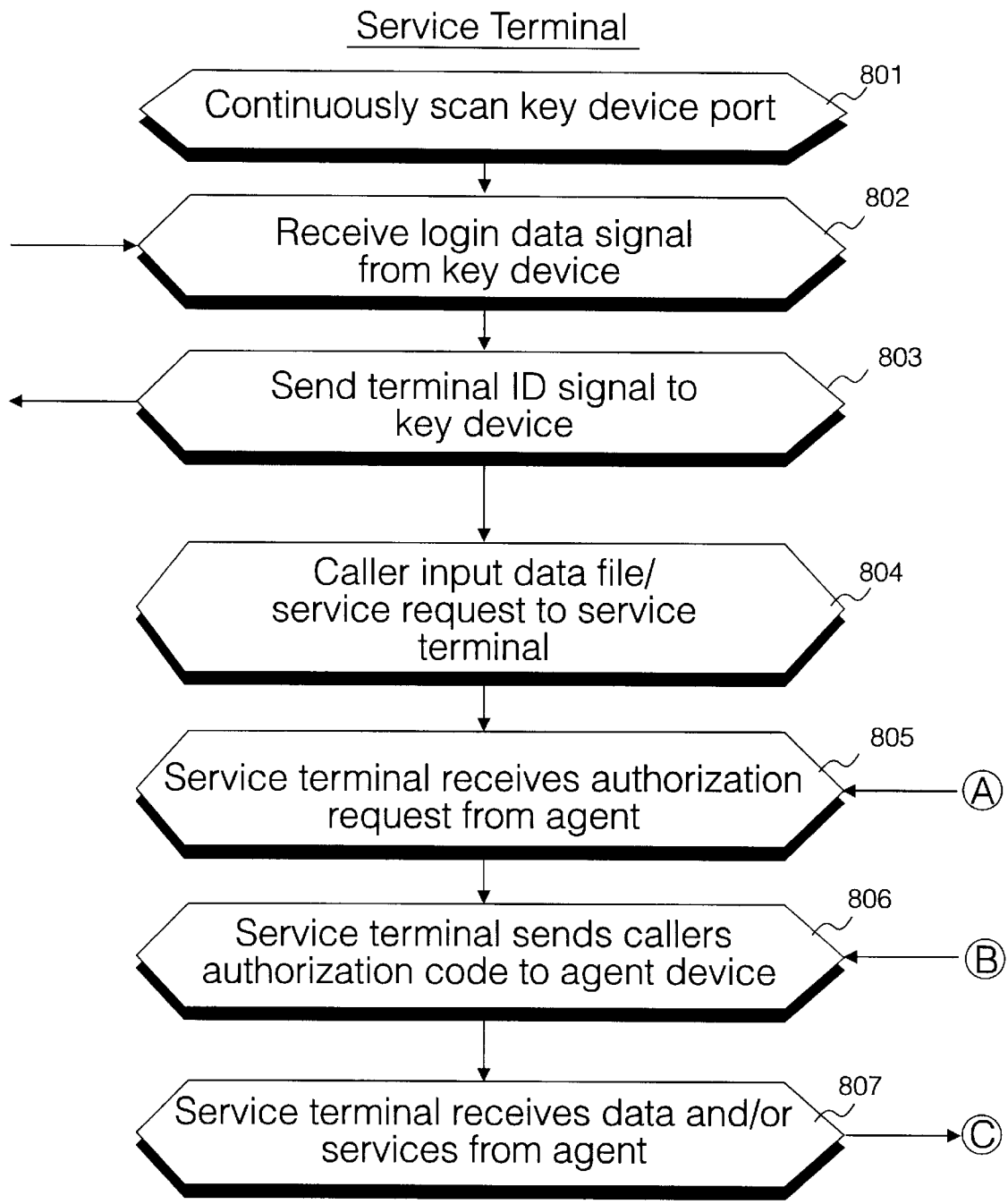
FIG. 8 illustrates an example of a sequence of operations at a service terminal of the data access and retrieval system of FIG. 1.
Figure 9:
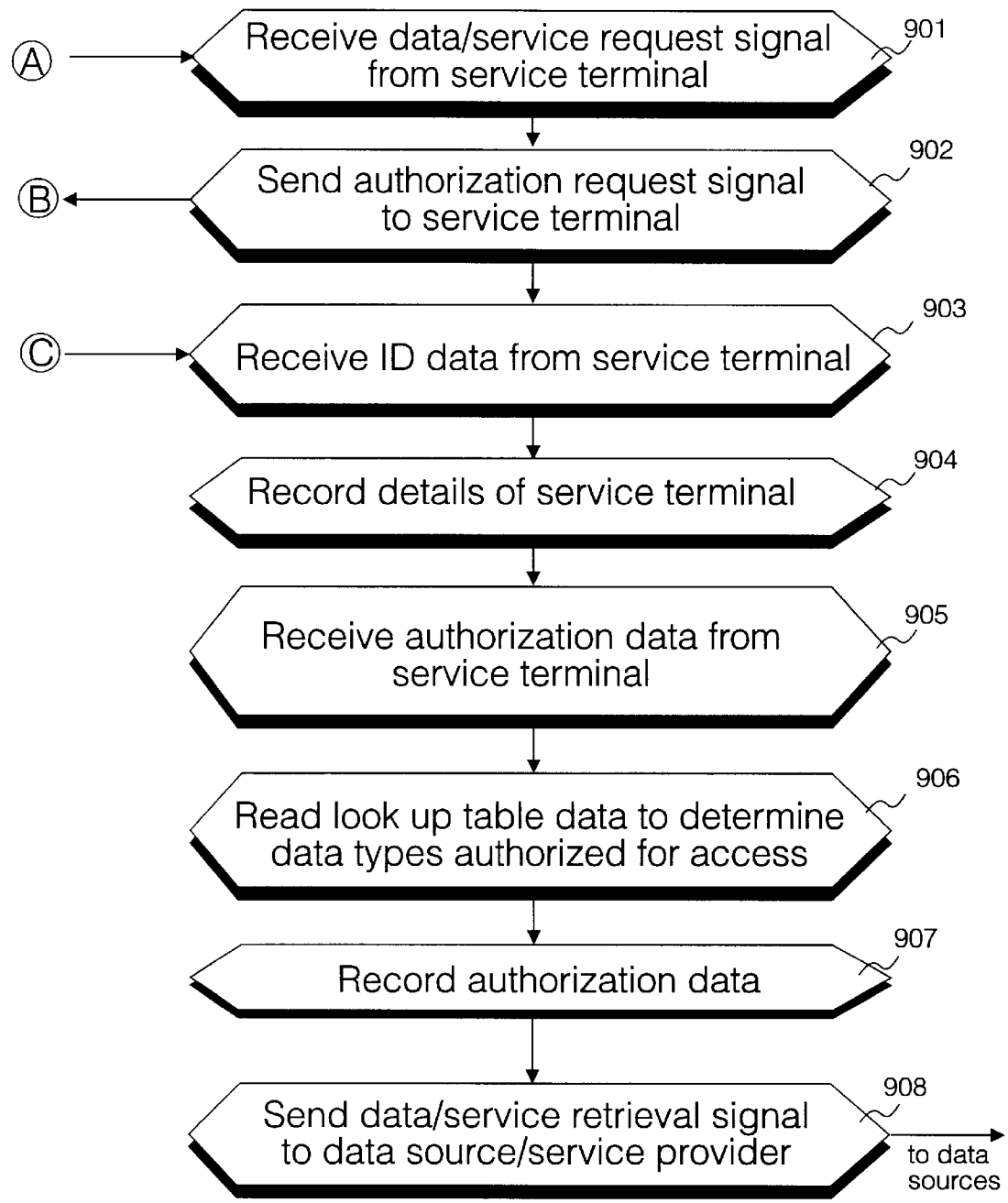
FIG. 9 illustrates an example of a sequence of operations of an agent device of the data access and retrieval system of FIG. 1.

Referring to FIGS. 7 to 9 herein, there are shown examples of signaling across the communications network between service terminal 701 and agent device 702, between key device 703 and the service terminal, and between the agent device and a plurality of user data sources 704–706. In step 801 the service terminal continuously scans a key device port of the service terminal, for example a card reader, monitoring for a key device log-in data signal presented by a key device on physical presentation of the key device to the port of the service terminal. The key device log-in data includes an address of an agent from which data is accessed. The key device log-in data signal is received by the service terminal in step 802. The service terminal responds by sending a terminal identification signal to the key device in step 803. The key device stores the service terminal identification signal, date and time data signals as electronic data. In step 804, the caller, who may be the user or may be another category of caller as described with reference to FIG. 2 herein, inputs a request to access user data or a service. The request may be in general terms, without specifying the individual file locations or user data source locations. The data request may be input as keyboard signals from a keyboard device of the service terminal or key device. The service terminal transmits a data access request signal over the communications network, eg the PSTN, cable network or TCP/IP Internet, which is received at the agent device 702 in step 901. The service terminal 701 also transmits an identification signal comprising identification data describing the service terminal itself including its location and address, as well as the identification of the operator and/or key device in response to an authorization request signal transmitted from the agent to the service terminal in step 902. On receipt of the data service request signal in step 901, and on receipt of the identification signal by the agent in step 903, the agent device records data describing the identification of the service terminal and the caller and the location of the service terminal in step 904. In step 902, the agent device sends an authorization request signal to the service terminal 702, where the status of the caller requires such authorization, or if the nature of the data request requires such authorization. Depending upon the type of authorization required, and as determined by the data stored in the look-up table of the agent, eg either password or digital electronic signature, the service terminal 702 interrogates the key device to obtain the digital electronic signature by an interrogation signal, and the key device responds with a digital electronic authorization signal, or alternatively a request for entry of password appears on a monitor of the service terminal, or on a monitor of the key device. The caller may then type in a password. The service terminal 701 encapsulates the password in an authorization response signal which is transmitted to the agent 702 and received in step 905. The authentication decoder 400 of the agent decodes the digital electronic signature, or compares the password with a pre-stored list of passwords pre-configured by the user, and allows or denies access to the user data as appropriate in step 906. The received authorization data from the service terminal is recorded by the agent in step 907. Where authorization is successful, the agent allows access to user data sources containing data as described in the look-up table 401. For example a caller who has been successfully identified as a co-worker may have access to diary information or project information. The authentication decoder enables the data retrieval signal generator to generate data retrieval signals which are transmitted to the databases/service providers in step 907 in response to data request signals received from the service terminal. User data sources respond by transmitting the requested user data to the agent. The agent relays the communications signals comprising user data or service data on to the service terminal, and it is received by the service terminal in step 808. The service terminal presents the user data or service data on its graphical user interface or the key device may be capable of presenting the data on its own video screen. The user and/or service data may be stored to a data storage medium at the key device or service terminal.

The user, by interrogating the agent device can list all access and retrieval events to the user data sources, and/or service providers specified in the agent device configuration. The user, by configuring the look-up table in the agent device may specify individual user databases and service providers to which individual callers or categories of caller may have access. Typically, a user may be able to reconfigure the look-up table in the agent device, only upon entry of a personal password, personal identification number or similar, and the agent device is kept in a physically secure location, eg at the user's workplace or domestic residence.

Figure 10:
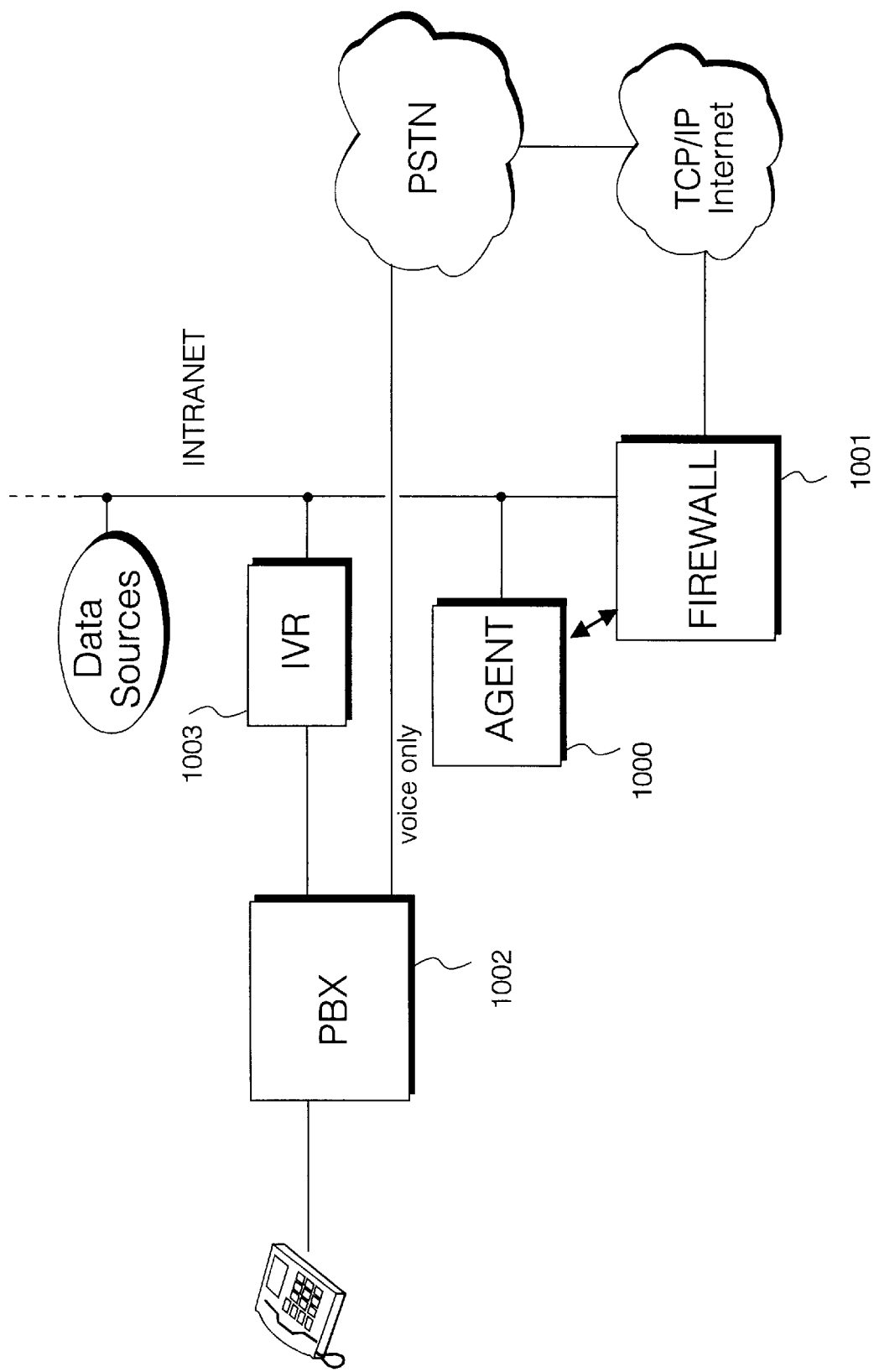
FIG. 10 illustrates a modification to the data access and retrieval system, in which an agent device co-operates with a proxy agent, such as a fire wall in a corporate Intranet or wide area network.

In FIG. 10 herein, there is illustrated in an example of an interaction between an agent device 1000 and a proxy agent 1001, for example a fire wall in a corporate wide area network or Intranet. The agent device, receiving data request signals from a plurality of remote service terminals, having received adequate authorization data from the service terminal and having authorized access to user data, transmits data retrieval signals to a user data source or service provider. The user data source may lie within a corporate network protected by a fire wall device 1001 in which case, in order to access and retrieve protected data at the protected user data source the agent must correspond with a fire wall protecting the corporate wide area network. The agent negotiates with the firewall by issuing coded security signals to the firewall, identifying the agent device to the firewall. The firewall device retrieves the user data from the protected user data sources, and relays the user data to the agent device. In this case, the agent device does not communicate directly with the user data source but uses the firewall device as a proxy agent, the firewall device performing the actual data access and retrieval from the protected user data sources.

Access to the user data sources may also be made via the Public Switched Telephone Network (PSTN) for voice communication through a local telecommunications network access point, for example a private branch exchange (PBX) 1002 and an interactive voice response device 1003. On receipt of a request from a remote service terminal communicating across the PSTN, in order for the interactive voice recorder to be authorized to give voice response data from data contained in user data source 1004, the agent 1000 operates to give clearance for supply of interactive voice response data. The remote service terminal must send identification signals and authorization signals including code words, passwords or electronic data encryption to agent 1000, before the agent will allow voice response of user data. The types of voice response data which can be accessed from the user data source 1004 within the corporate wide area network protected by fire wall 1001 are determined by agent 1000, which contains a look-up table as described previously, pre-reconfigured with data signals describing the types and locations of user data which may be accessed by callers of differing types. Each caller or type of caller is allowed access to different sets of data and/or services, the nature of which are described by data stored in the look-up table comprising the agent 1000. The agent 1000 provides a "personalized view" of different types of data available for access from remote callers operating remote service terminals, the agent allowing or denying access to various categories of service and/or user data depending upon the authorization level and type of caller.

Abbreviations

IVR Interactive Voice Responder
PBX Private Branch Exchange
PSTN Public Switched Telephone Network
ROM Read Only Memory
TCP/IP Transmission Control Protocol/Internet Protocol
WAN Wide Area Network

We claim:

1. An agent device for regulating access to user data in response to a request for user data generated at a remote location across a communications network, said apparatus comprising:

a data storage means storing, data describing a plurality of caller types, for each said caller type, data describing a type of user data accessible by said caller type, and for each said user data type, data describing a corresponding authentication method required to access said user data type; and an authorization decoder for receiving a plurality of authorization signals representing different levels of authorization to access different types of said user data, and for recognizing said authorization signals according to a said authentication method; and a data access signal generator for generating data access signals for accessing authorized data types;

wherein said agent device allows or denies access to portions of stored data depending on a type of caller and a level of said received authorization signal.

2. An agent device as claimed in claim 1, wherein said data storage means is partitioned into a plurality of different data sets, each comprising a set of said user data types which are authorized by a said user for access by callers in response to receipt of a said recognized authorization signal.

3. An agent device as claimed in claim 1, wherein said user data types include data types pre-defined by a said user, and available from a user data source.

4. An agent device as claimed in claim 1, wherein said user data types include service data available from a service provider device.

5. An agent device as claimed in claim 1, wherein said data storage means stores:

data describing a plurality of types of said authorization signals; and data describing a plurality of said user data types accessible in response to receipt of each said recognized authorization signal type.

6. An agent device as claimed in claim 1, wherein said authorization decoder comprises a decryption means for recognizing a received encrypted authorization signal.

7. An agent device as claimed in claim 1, wherein said authorization decoder comprises a means for encryption of said accessible data.

8. A method of a acessing a plurality of user data sources over a communications network from a location remote from said user data sources, said method comprising the steps of:

storing in a look-up table data describing a type of caller;

storing in said look-up table for each said caller type data designing types of user data accessible by said caller type;

for each said user data type, storing in said look-up table data describing a corresponding authentication method, wherein a type of said authentication method depends on a type of said user data requested by said caller; and receiving a request signal requesting access to user data available from at least one said user data source;

receiving an authorization signal representing an authorization to access user data available from said at least one user data source;

recognizing said authorization signal according to said authentication method;

reading said look-up table data describing types of user data which are authorized for access in response to a said received authorization signal; and accessing authorized data types from at least one said user data source, wherein access to said authorized types of user data is allowed or denied depending on a type of said caller, and a level of authorization of said recieved authorization signed.

9. A method as claimed in claim 8, wherein said step of recognizing an authorization signal comprise decoding an encrypted data signal.

* * * * *